Feb. 4, 1958  L. O. CARLSEN ET AL  2,822,226
SPINDLE ASSEMBLY FOR MACHINE TOOLS
Original Filed June 25, 1952

INVENTORS
LEONARD O. CARLSEN
HERMAN A. MALE
BY Richard W. Treverton
ATTORNEY

United States Patent Office 2,822,226
Patented Feb. 4, 1958

2,822,226

SPINDLE ASSEMBLY FOR MACHINE TOOLS

Leonard O. Carlsen, Rochester, and Herman A. Male, Brighton, N. Y., assignors to The Gleason Works, Rochester, N. Y., a corporation of New York Original application June 25, 1952, Serial No. 295,452, now Patent No. 2,792,764, dated May 21, 1957. Divided and this application August 11, 1954, Serial No. 449,208

8 Claims. (Cl. 308—236)

The present invention relates to a spindle assembly for machine tools, such for example as the cutter spindle assembly of a bevel gear cutting machine, and is a division of our co-pending patent application Serial No. 295,452, filed June 25, 1952, for "Gear Cutting Machine Spindle Mounting," now Patent Number 2,792,764.

Such a spindle is advantageously journaled in axially spaced anti-friction bearing units comprising ball bearings whose inner and outer races are respectively mounted on the spindle and within bores in their supporting member. The cutter mounting surface of the spindle is preferably ground while the spindle is rotated in these same bearings, so that any eccentricity of such surface is obviated. However it has been discovered that in continued use of the machine the inner races will gradually creep around the spindle, and the outer races around the bores in the supporting member, with the result that eccentricity of the cutter mounting surface develops. To obviate this condition, each race is interlocked by keying means to the member on which it is mounted. According to the invention the inner race keying means includes a keyway formed in the race, a key mounted in the spindle for movement relative thereto between a first position wherein it projects from the spindle into the keyway and a second position wherein it is retracted from the keyway into the spindle, a key actuating member movable in the spindle in opposite directions and accessible from one end of the spindle for the purpose of being so moved, and a positive-acting and reversible drive connection between said member and the key whereby the latter may be positively moved between said first and second positions in either direction by moving said member. Preferably the key actuating member is rotatable in the spindle about an axis extending in the general direction of the spindle axis, the member having gear teeth meshing with rack teeth provided on the key. Hence by rotation of the member relative to the spindle, the key may be engaged in the keyway during assembly of the spindle and bearing units or withdrawn from the keyway to permit disassembly.

Figures 1, 2:
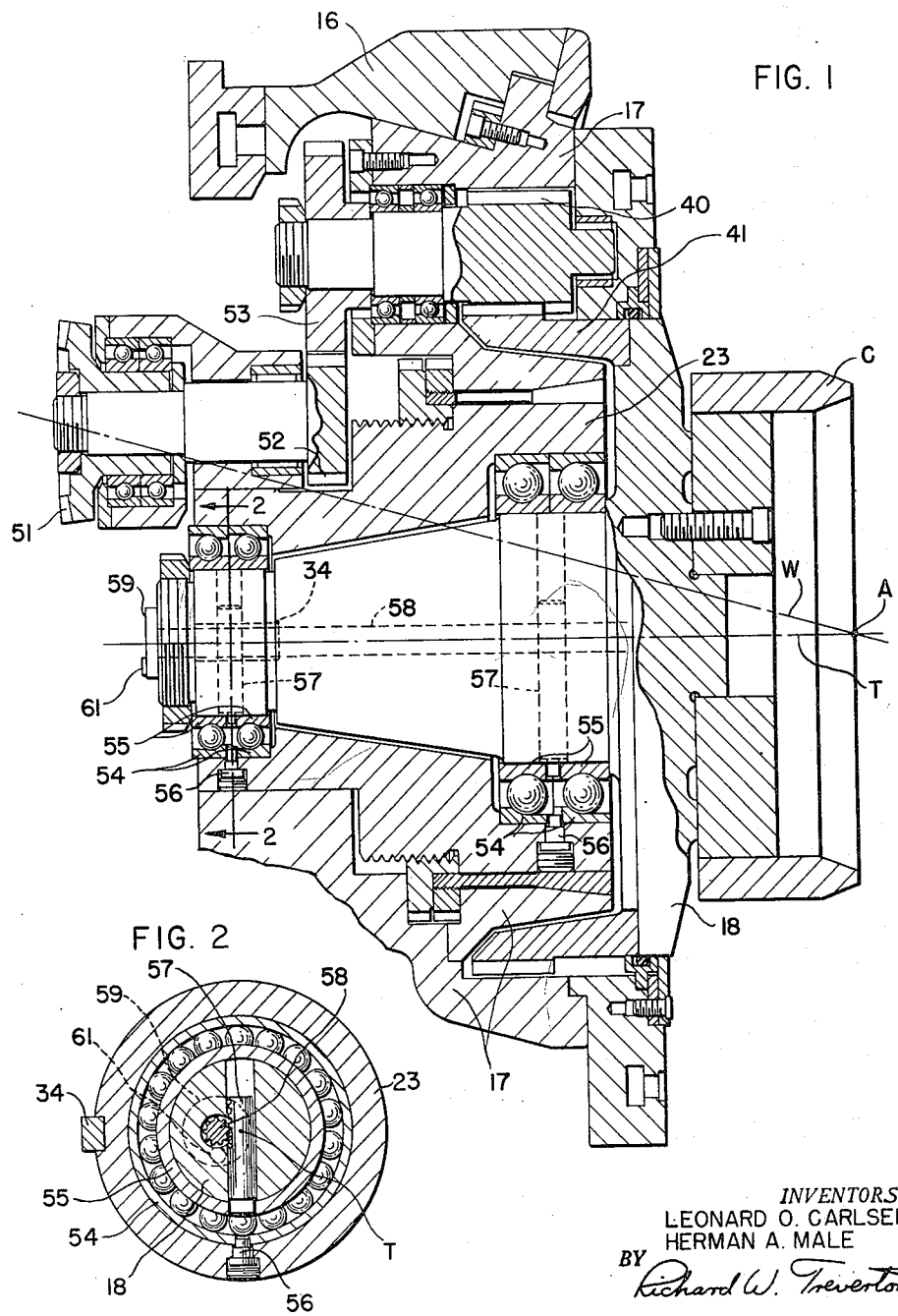
Fig. 1 is an axial sectional view through the spindle assembly.
Fig. 2 is a cross-section in the plane 2—2 of Fig. 1.

The invention is shown as applied to a gear cutting machine of the general type disclosed in Patent No. 2,667,818, granted February 2, 1954, to A. L. Stewart and L. O. Carlsen. The spindle housing of the machine has as a part thereof a quill 23 which is supported by parts 16 and 17 for adjustment about axes T and W which intersect at point A, and also for adjustment along axis T, as is more fully described and claimed in the specification of our aforementioned co-pending application Serial No. 295,452. The quill 23 is firmly secured to parts 16 and 17 by means which include a key 34. The cutter spindle 18, on whose nose the face mill gear cutter C is mounted, is driven through a gear train including gears 51, 52, 53, 40 and 41, the latter being secured on the spindle.

The spindle is journaled in quill 23 in front and rear ball bearing units each of which has outer annular races 54 fitted in bores in the quill and inner annular races 55 fitted on the spindle. The bearing units are retained, under an axial preload, in assembly with the quill and the spindle by a shoulder at the outer end of the spindle and a nut threaded on the inner end of the spindle, as shown. The bearing races are fitted tightly to their respective supporting parts 23 and 18 but in order to prevent them from creeping rotatively relative to these parts they are interlocked to the latter by keying means. These means comprise pins 56 that have their inner ends squared to engage in the radial keyways in the inner end faces of the races 54 and that are locked in the quill by clamp screws as shown. The keying means further comprise keys 57 engaging in radial keyways in the inner end faces of races 55. Each key 57 is slidable in a diametrical bore through the spindle and is provided with rack teeth meshing with pinion teeth cut in a shaft 58 which is rotatable in the spindle eccentrically of axis T. The keys 57 may be shifted axially to engage in the keyways in races 55, or to withdraw therefrom, by turning shaft 58. The shaft may be turned with a suitable wrench engaged with head 59 of the shaft, after first removing a lock screw 61 which holds the shaft against rotation in the spindle when the machine is assembled.

What we claim is:

1. A machine spindle assembly comprising a spindle housing, a spindle journaled in the housing on anti-friction bearing means including a bearing race mounted on the spindle, said race having a keyway formed therein, a key mounted in the spindle for movement relative thereto between a first position wherein it projects from the spindle into said keyway and a second position wherein it is retracted from the keyway into the spindle, a key actuating member movable in the spindle in opposite directions and accessible from one end of the spindle for the purpose of being so moved, and a positive-acting and reversible drive connection between said member and the key whereby the latter may be positively moved between said first and second positions in either direction by moving said member.

2. A machine spindle assembly comprising a spindle housing, a spindle journaled in the housing on anti-friction bearing means including a bearing race mounted on the spindle, said race having a keyway formed therein, a key mounted in the spindle for movement relative thereto between a first position wherein it projects from the spindle into said keyway and a second position wherein it is retracted from the keyway into the spindle, a key actuating member rotatable in the spindle about an axis extending in the general direction of the spindle axis and having one end thereof accessible from one end of the spindle, and a positive-acting and reversible drive connection between said member and the key whereby the latter may be positively moved between said first and second positions in either direction by turning said member in the spindle.

3. A machine spindle assembly comprising a spindle housing, a spindle journaled in the housing on anti-friction bearing means including a bearing race mounted on the spindle, said race having a keyway formed therein, a key mounted in the spindle for movement relative thereto between a first position wherein it projects from the spindle into said keyway and a second position wherein it is retracted from the keyway into the spindle, and means mounted in the spindle and operable from one end of the latter for moving the key between said first and second positions, said means comprising a member rotatable in the spindle about an axis extending in the general direction of the spindle axis, said member having gear teeth thereon, and the key having rack teeth meshing with said gear teeth and being movable in the spindle substantially radially of the latter.

4. A machine spindle assembly comprising a spindle housing, a spindle journaled in the housing on anti-friction bearing means including a pair of inner bearing races mounted on the spindle in end to end relationship to each other, the adjacent end faces of said races each having a keyway therein, said keyways being aligned to thereby form a single key-receiving opening extending substantially radially of the races and a key mounted in the spindle for movement relative thereto between a first position wherein it projects into said opening comprising both keyways and a second position wherein it is retracted from the keyways into the spindle.

5. A machine spindle assembly comprising a spindle housing, a spindle journaled in the housing on anti-friction bearing means including at least one inner bearing race mounted on the spindle and a pair of outer bearing races mounted in the housing in end to end relationship to each other, said inner race having a keyway formed therein, a key mounted in the spindle for movement relative thereto between a first position wherein it projects from the spindle into said keyway and a second position wherein it is retracted from the keyway into the spindle, the adjacent end faces of said outer races each having a keyway therein, said keyways of the outer races being aligned to thereby form a single key-receiving opening extending substantially radially of the races and a key removably mounted in the housing and projecting into said opening comprising both of the last-mentioned keyways.

6. A machine spindle assembly comprising a spindle housing, a spindle journaled in the housing on anti-friction bearing means including a pair of inner bearing races mounted on the spindle in end to end relationship to each other, the adjacent end faces of said races each having a keyway therein, said keyways being aligned to thereby form a single key-receiving opening extending substantially radially of the races, a key movable substantially radially in said spindle between a first position wherein it projects from the spindle into said opening comprising both keyways and a second position in which it is retracted from said opening, a key actuating member rotatable in the spindle about an axis extending in the general direction of the spindle axis and having one end thereof accessible from one end of the spindle, and a positive-acting and reversible drive connection between said member and the key whereby the latter may be positively moved between said first and second positions in either direction by turning said member in the spindle.

7. A machine spindle assembly comprising a spindle housing, a spindle journaled in the housing on anti-friction bearings which include a pair of inner races mounted on the spindle in end to end relationship to each other, the adjacent end faces of said races each having a keyway therein, said keyways being aligned to thereby form a single key-receiving opening extending substantially radially of said races, and a key mounted removably in the spindle and projecting into said opening comprising both keyways.

8. A machine spindle assembly comprising a spindle housing, a spindle journaled in the housing on anti-friction bearings which include a pair of outer races mounted in the housing in end to end relationship to each other, the adjacent end faces of said races each having a keyway therein, said keyways being aligned to thereby form a single key-receiving opening extending substantially radially of said races, and a key mounted removably in the housing and projecting into said opening comprising both keyways.

References Cited in the file of this patent

UNITED STATES PATENTS

| | | |
|---|---|---|
| 1,251,110 | Ross | Dec. 25, 1917 |
| 1,255,378 | Beach | Feb. 5, 1918 |
| 1,513,375 | Dlesk | Oct. 28, 1924 |
| 1,611,912 | Hleb | Dec. 28, 1926 |

FOREIGN PATENTS

| | | |
|---|---|---|
| 459,641 | France | Mar. 8, 1913 |